United States Patent [19]
Gessay

[11] Patent Number: 6,099,061
[45] Date of Patent: Aug. 8, 2000

[54] TRUCK BODY EXTENSION

[76] Inventor: Brett A. Gessay, 1227 Spaulding Turnpike, Newington, N.H. 03801

[21] Appl. No.: 09/086,132

[22] Filed: May 28, 1998

[51] Int. Cl.[7] ....................................................... B60P 3/40
[52] U.S. Cl. ........................ 296/26.08; 296/43; 224/405; 224/488
[58] Field of Search ................ 296/26.08, 26.09, 296/26.12, 26.13, 4, 5, 6, 7, 43, 26.03; 224/402, 405, 488, 518, 519, 520, 521, 544, 556, 557, 403

[56] References Cited

U.S. PATENT DOCUMENTS

| | | | |
|---|---|---|---|
| 1,143,066 | 6/1915 | Plante | 211/90.01 |
| 1,412,192 | 4/1922 | Moore | 224/490 |
| 2,729,499 | 1/1956 | Eggum | 296/26.09 |
| 3,650,443 | 3/1972 | Haskett et al. | 224/42.03 A |
| 4,057,286 | 11/1977 | Elonen | 296/43 |
| 4,216,988 | 8/1980 | Weiss | 296/43 |
| 4,390,141 | 6/1983 | Webster | 242/86.5 R |
| 4,856,840 | 8/1989 | Hanley | 296/26 |
| 4,951,991 | 8/1990 | Haigler | 296/26 |
| 5,104,015 | 4/1992 | Johnson | 224/42.06 |
| 5,228,607 | 7/1993 | Tolsdorf | 224/42.03 B |

FOREIGN PATENT DOCUMENTS

| | | | |
|---|---|---|---|
| 1238626 | 7/1960 | France | 296/26.08 |
| 2827095 | 1/1980 | Germany | 296/136 |
| 583322 | 10/1958 | Italy | 296/26.08 |

*Primary Examiner*—D. Glenn Dayoan
*Assistant Examiner*—Paul Chenevert
*Attorney, Agent, or Firm*—Mark D. Lorusso

[57] ABSTRACT

An apparatus for extending a truck body bed is disclosed having elongated members secured to a truck body bed with insertion pins matingly engaged to apertures situated in an end plate of the truck body bed. The apparatus is useful for safely moving materials that are longer than the truck body bed being used to move the materials.

7 Claims, 15 Drawing Sheets

TRUCK BODY EXTENSION

BACKGROUND OF THE INVENTION

1. Field of the Invention

The disclosed invention relates generally to automotive vehicles and in particular, to truck vehicles having truck body beds.

2. Description of the Related Art

To facilitate the transportation of a large variety of products, truck manufacturing companies have designed and produced a number of different size vehicles to handle varying transportation demands. For example, when materials exceeding approximately eight feet in length have to be transported, trucks known as flat bed trucks are typically used to handle the long materials. Such trucks have beds designed to accommodate long heavy materials such as lumber. In contrast, standard utility trucks, e.g., pick-up trucks, have beds that range typically from six to eight feet and are not specifically designed to handle long loads adequately. To haul materials longer than the length of a pick-up truck bed, certain state and federally instituted regulations require certain precautions be taken such as the placement of a red flag on the end of the material to warn drivers, approaching from the rear of the truck, that an extended load is extant in the vehicle ahead.

Some manufacturers and more significantly, after-market manufacturers, have devised systems known as ladder racks to enhance the capability of a pick-up truck to handle long loads. The ladder racks are essentially H-shaped tubular structures that are placed at the extreme longitudinal ends of a pick-up truck bed. Long materials are placed on the horizontal portions of the racks which provide vertical support for the materials. The top portions of the rack vertical legs extend above the horizontal portions and provide horizontal stability so that the materials do not shift laterally off the truck. Ladder-rack-type truck bed modifications are useful to the extent that long loads that extend beyond the rear of the truck can be elevated above the height of passenger vehicles. However, depending on the weight of the load, an upward shift in the center of gravity of the truck can lead to precarious driving situations. For example, turns have to be executed at slower speeds to avoid, or more precisely, to reduce the shift in inertia that takes place when a turn is negotiated. This factor significantly limits the amount of weight that can be placed on the ladder racks regardless of the maximum weight the racks can bear.

Additional problems arise when loading and unloading the ladder racks. Due to the fact that the horizontal weight bearing portions of the racks are suspended well above ground level, the user must lift the materials being transported up to the horizontal portions of the ladder racks. In the typical situation that a user would encounter on a construction site, the user must raise the materials with brute force overhead. The body movements that have to be executed place the user in awkward physical positions that could lead to injury. Similar problems arise when the material is removed from the ladder racks at the destination point.

Another solution to hauling long loads is to purchase a truck specifically designed to carry such loads. For example, trucks such as the aforementioned flat bed trucks have beds that are relatively low, flat and long. Trucks of this type enable the truck operator to transport heavy loads due to the combination of a long bed that lies low relative to the overall height of the vehicle. By providing complete horizontal and vertical support for the materials while maintaining a low center of gravity, the materials can be moved efficiently without jeopardizing the safety of the driver or any adjacent vehicles.

Although this effectively will solve the problems associated with hauling long heavy loads, additional problems arise. Foremost among the problems is the cost associated with either purchasing or renting a flat bed truck. The present invention solves these and other problems as well.

It is therefore an object of this invention to provide a means to transport heavy long loads without having to obtain a truck specifically designed to accommodate long heavy loads. It is a further object of the invention to provide an aftermarket accessory for pick-up truck or dump truck type vehicles that can be used to effectively and safely transport long heavy loads.

A still further object is to provide a truck body extension accessory that can be easily and cost-effectively manufactured. An additional object of the invention is to eliminate the need for expensive long bed or flat bed trucks to accommodate long heavy loads such as dimensional lumber exceeding eight feet in length.

SUMMARY OF THE INVENTION

The truck body extension apparatus is configured generally in the shape of a ladder that is oriented parallel to, or coplanar with, a longitudinal axis of a truck vehicle. The apparatus has at least one longitudinal member. In embodiments with at least two longitudinal members, the members are attached by at least one horizontal member. The forward ends of the longitudinal members can also be connected by a horizontal plate. Extending from the forward ends of each longitudinal member is an insertion pin which extends from the bottom of each longitudinal members and is formed to correspond in shape to insertion pin receiving apertures in a truck body bed.

To secure the longitudinal members in a horizontal plane parallel or substantially coplanar with the longitudinal axis of the vehicle, support pins are provided which extend from the bottom of the longitudinal members and distal to the forward ends of the longitudinal members relative to the position of the insertion pins. The combination of the insertion pins and support pins act to wedge the extension apparatus in place when a load is placed particularly on the distal end of the apparatus.

To provide horizontal support to any load carried on the extension apparatus, guide pins extending from the distal, top ends of the longitudinal members are provided. During vehicle turning maneuvers, the guide pins prevent horizontal displacement of the load due to inertial forces acting on the load.

These and other objects and features of the present invention will become apparent from a reading of the following detailed description of the invention.

BRIEF DESCRIPTION OF THE DRAWINGS

FIG. 10 is a top plan view of another embodiment of the invention.

FIG. 17a is a side plan view of a mounting bracket according to one embodiment of the invention.

DETAILED DESCRIPTION OF THE INVENTION

Figure 1A:
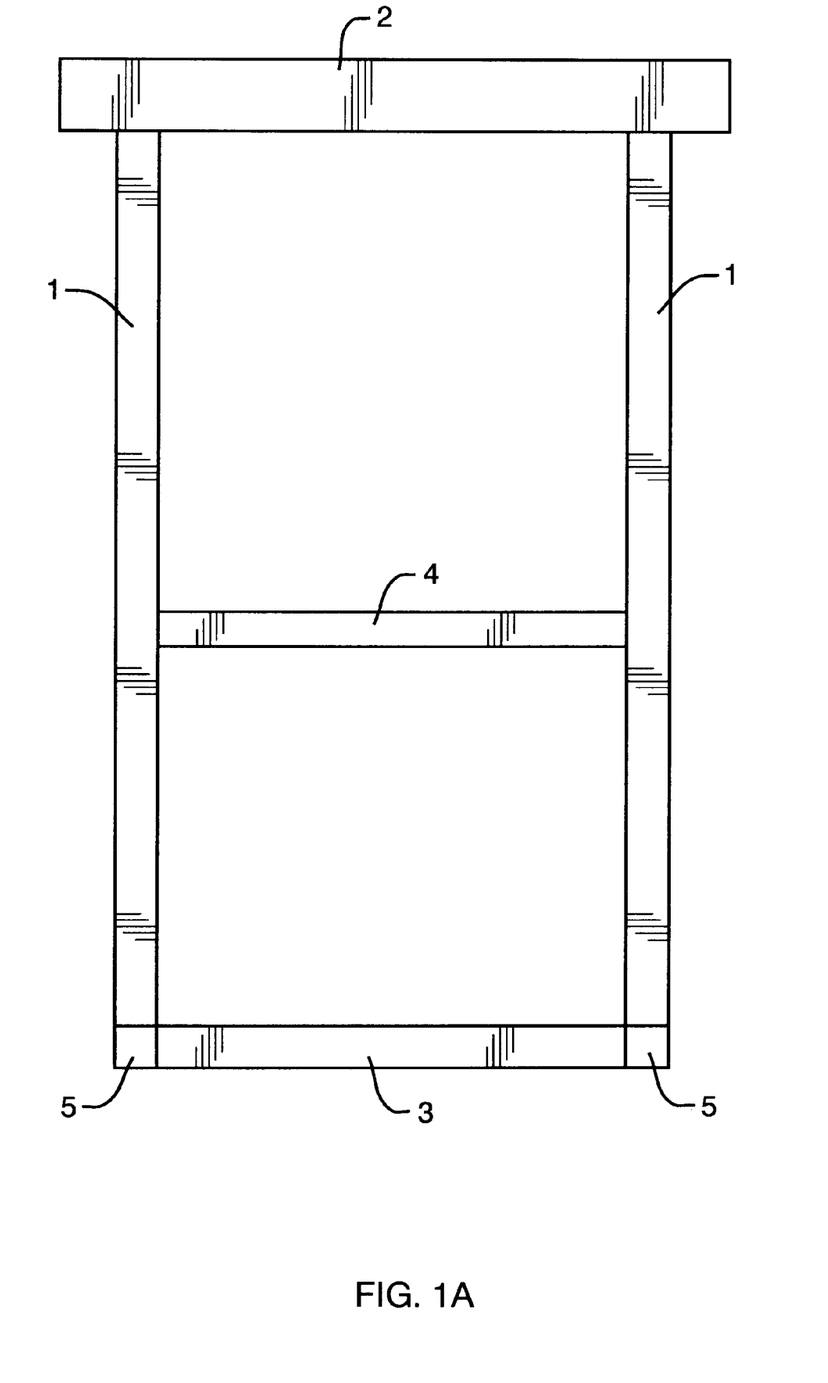
FIG. 1a is a top plan view of one embodiment of the invention.
Figure 1B:
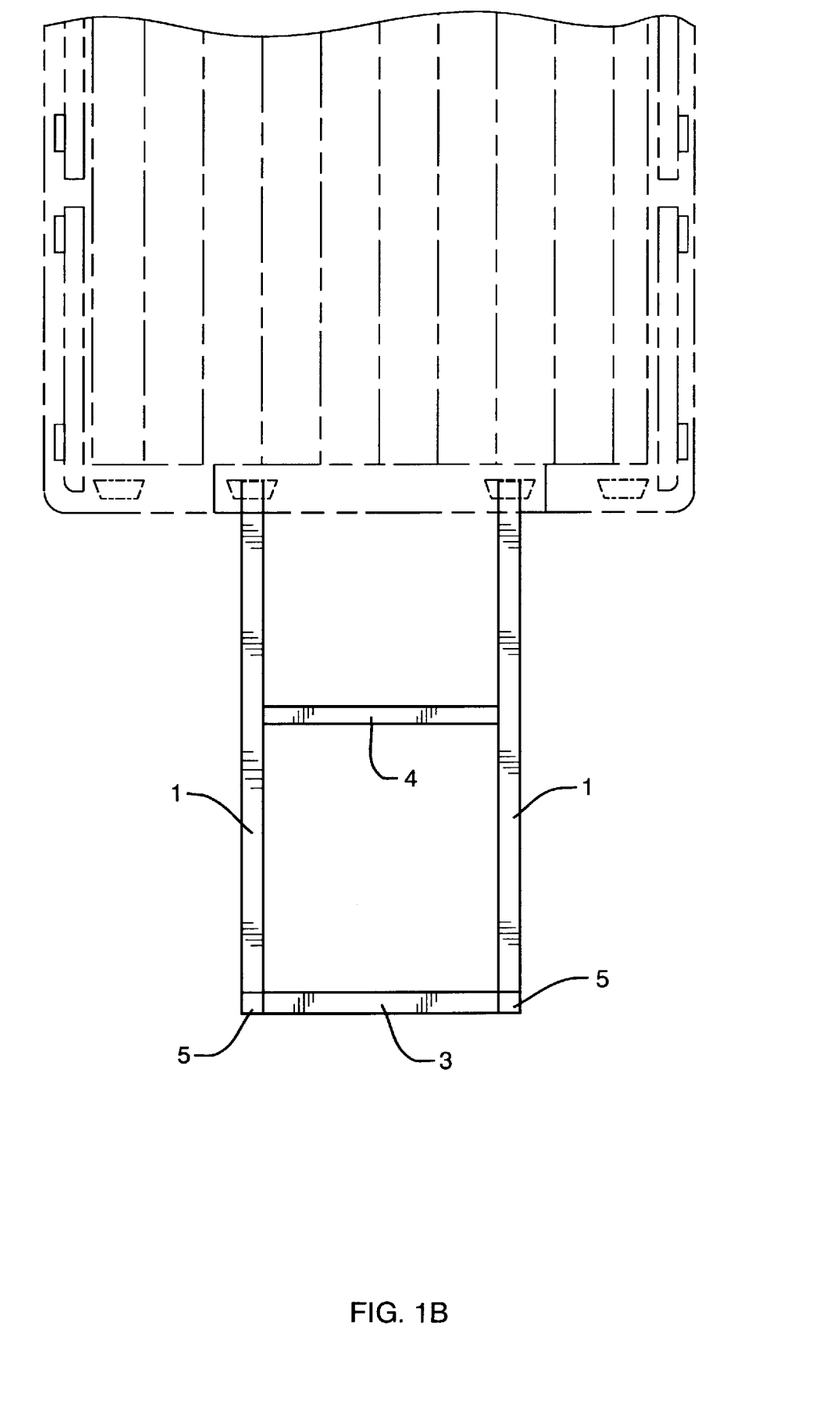
FIG. 1 is a top plan view of one embodiment of the invention.

Referring to FIG. 1, the truck body extension apparatus is shown having two elongated members 1. Attached to a proximal end of said elongated members 1 is a front cross member 2. In an alternative embodiment, front cross member 2 can be eliminated as shown in FIG. 1a. Attached to a distal end of said elongated members 1 is a back cross member 3. An optional at least one cross member 4 can be attached to said elongated members 1 at any point between the proximal and distal ends of said elongated members. Preferably, the at least one cross member 4 has a circular cross-section to minimize contact with the material being transported. This facilitates removal of the material from the extension apparatus. Optional guide pins 5 can be provided which extend upward from the distal ends of said elongated members 1. The combination of the elongated members, the front cross member, the back cross member and the optional at least one cross member comprise the main weight supporting assembly of the truck body extension invention.

Figure 2A:
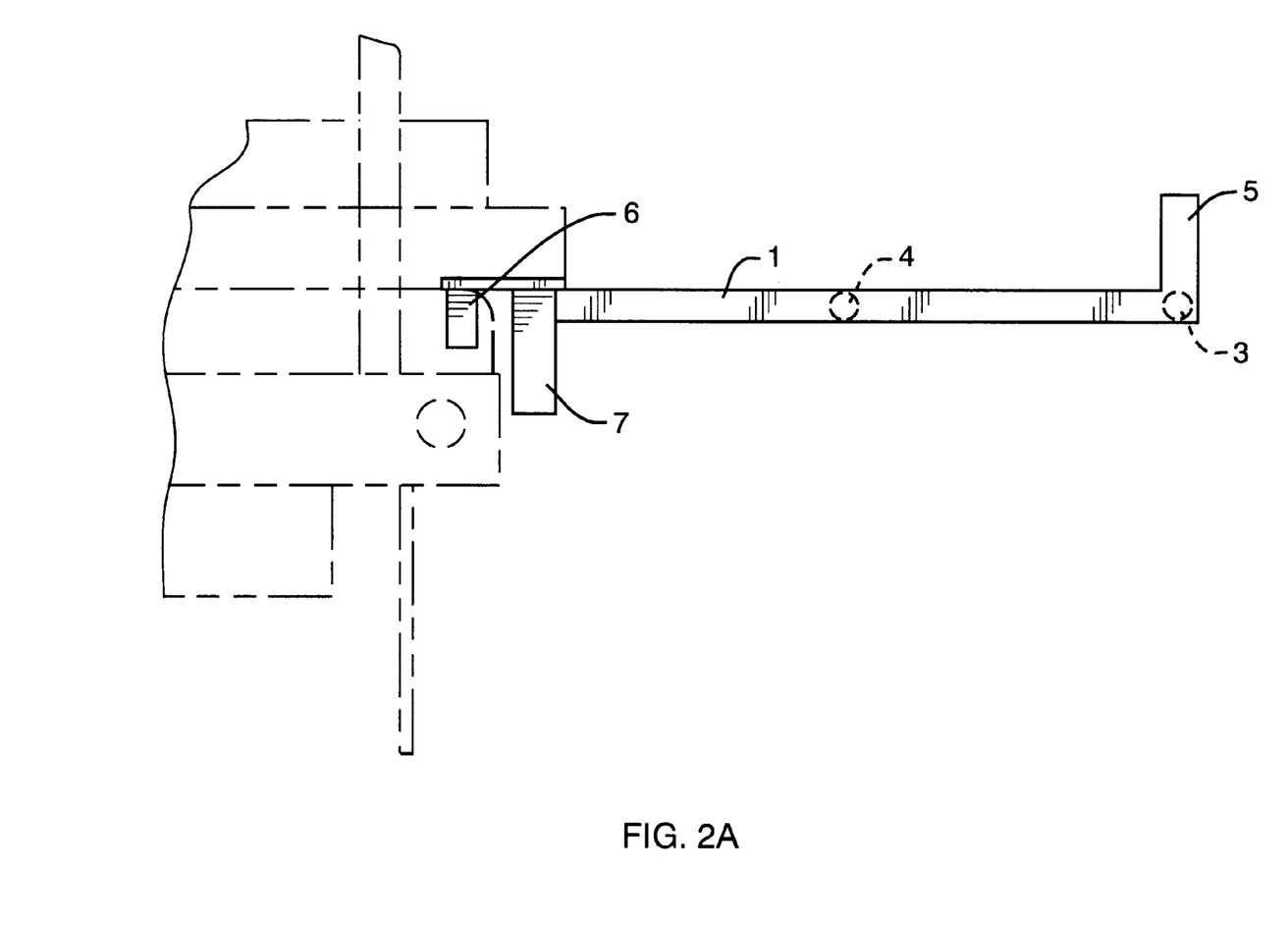
FIG. 2a is a side, elevational view of one embodiment of the invention attached to a conventional truck bed.
Figure 2B:
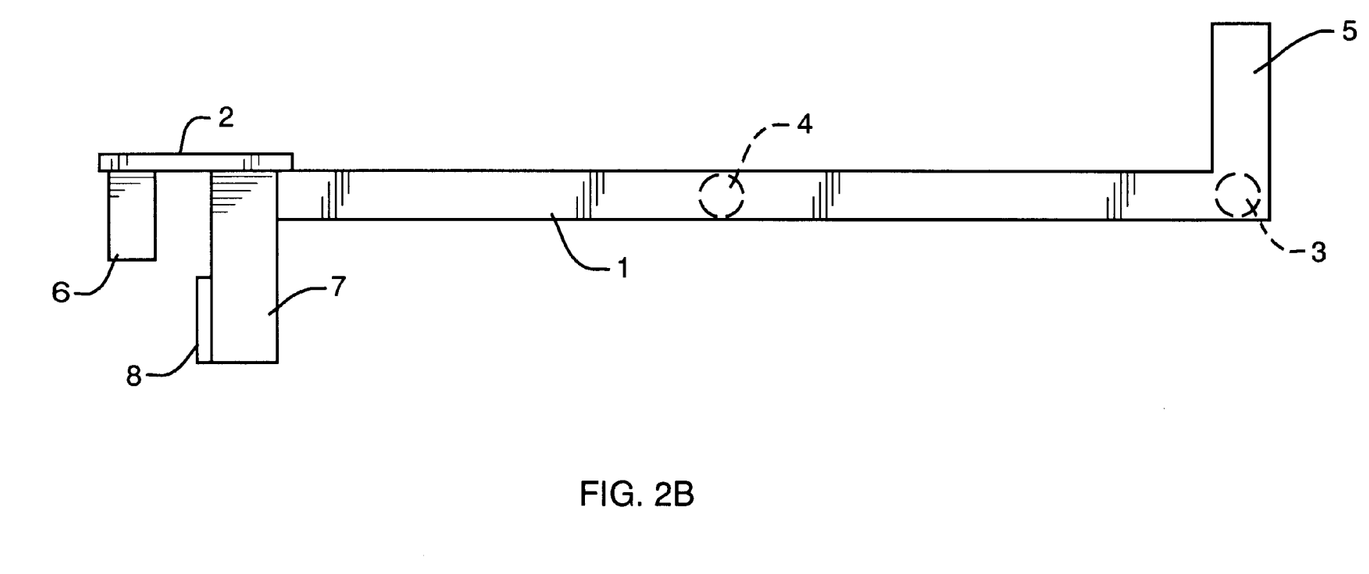
FIG. 2b is a side, elevational view of another embodiment of the invention.
Figure 2C:
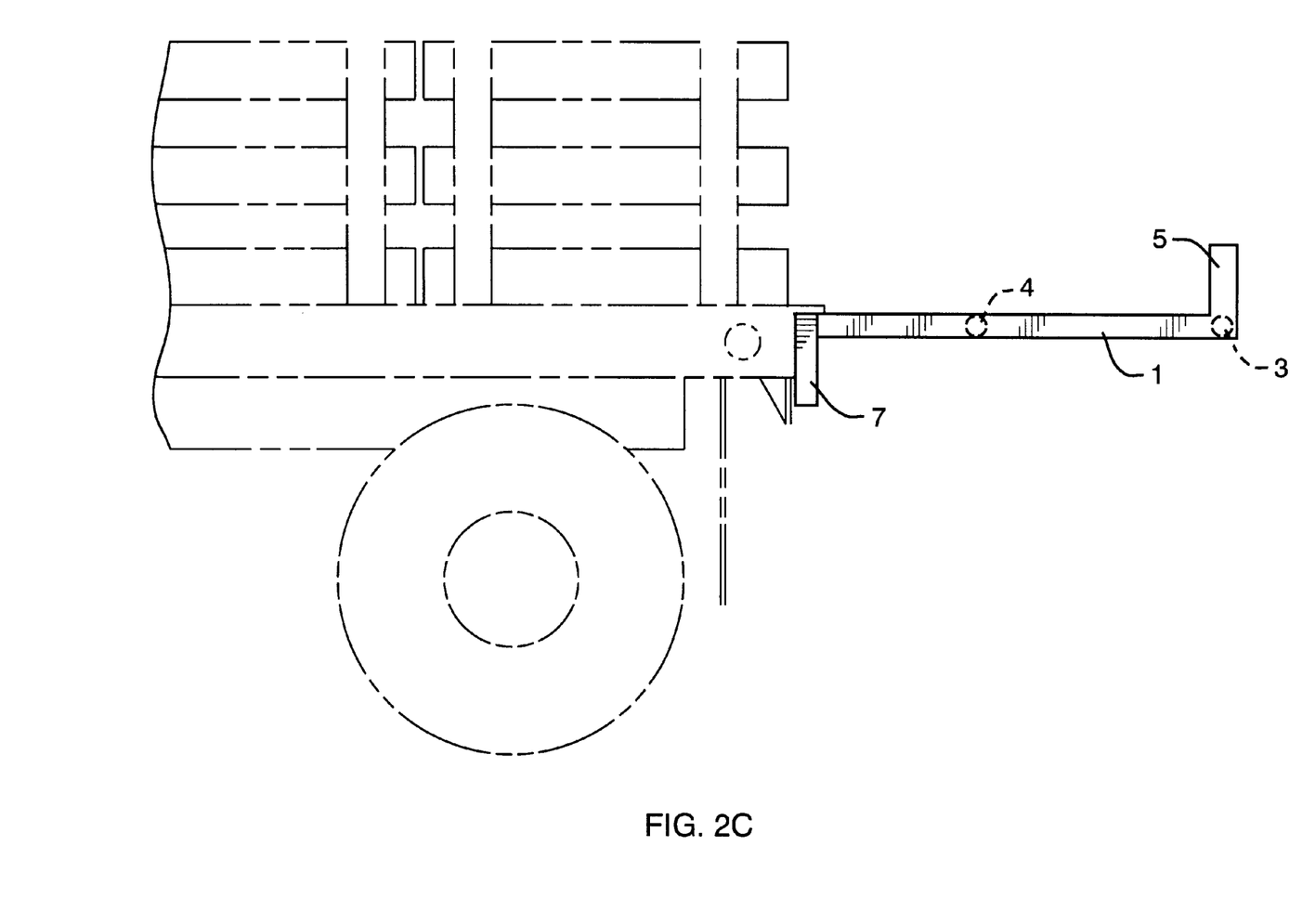
FIG. 2c is a side, elevational view of one embodiment of the invention.

Turning to FIGS. 2, 2a, 2b, 5, 6 and 7, insertion pins 6 extend down from a front edge of the front cross member 2. Insertion pins 6 matingly engage insertion pin receiving apertures 100 in a vehicle end plate as shown in FIG. 1a. It should be noted that the insertion pin receiving apertures do not form a part of the invention described herein. To secure the extension apparatus in a horizontal plane preferably substantially coplanar with the truck body bed, support pins 7 are provided. Support pins 7 extend from the bottom of elongated members 1 distal to the proximal ends of the longitudinal members 1 relative to the position of the insertion pins 6. Support pins 7 are situated to lie against the vehicle end plate as shown in FIG. 2b. The combination of the insertion pins 6 and support pins 7 act to wedge the extension apparatus in place when a load is placed particularly on the distal end of the apparatus. An optional plate 8 can be attached to the distal ends of support pins 7 to provide added structural support or to aid horizontal alignment of the extension apparatus relative to the truck body bed if the distance between insertion pin 6 and support pin 7 is such that when insertion pin 6 is inserted into the pin receiving apertures in the truck body bed, a gap exists between support pin 7 and the end of the truck body bed.

Figure 3:
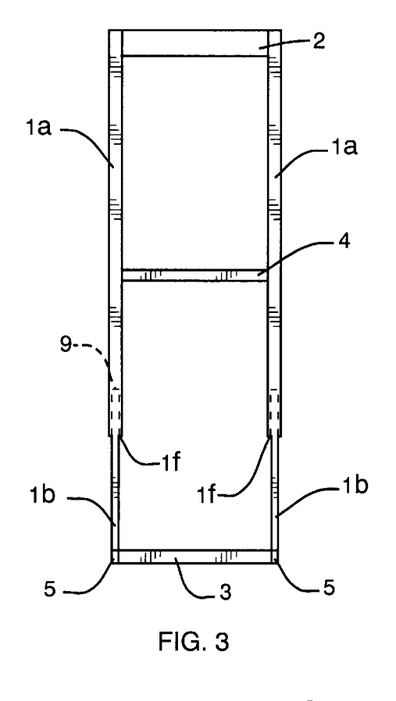
FIG. 3 is a top view of another embodiment of the invention.
Figure 4:
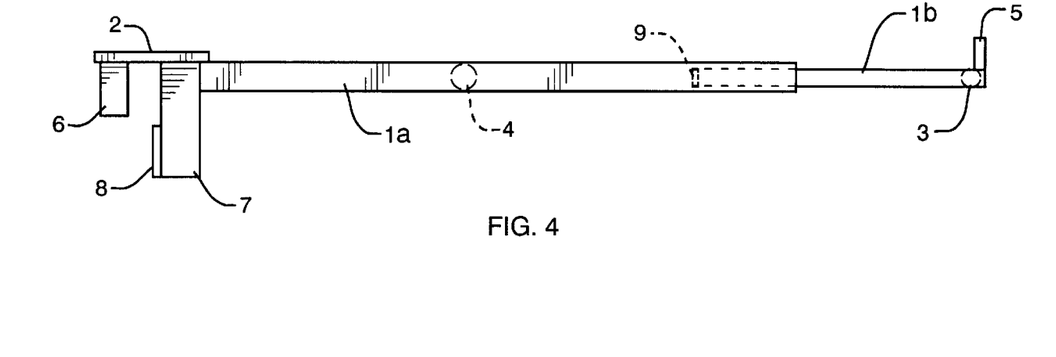
FIG. 4 is a side elevation view of another embodiment of the invention.
Figure 5:
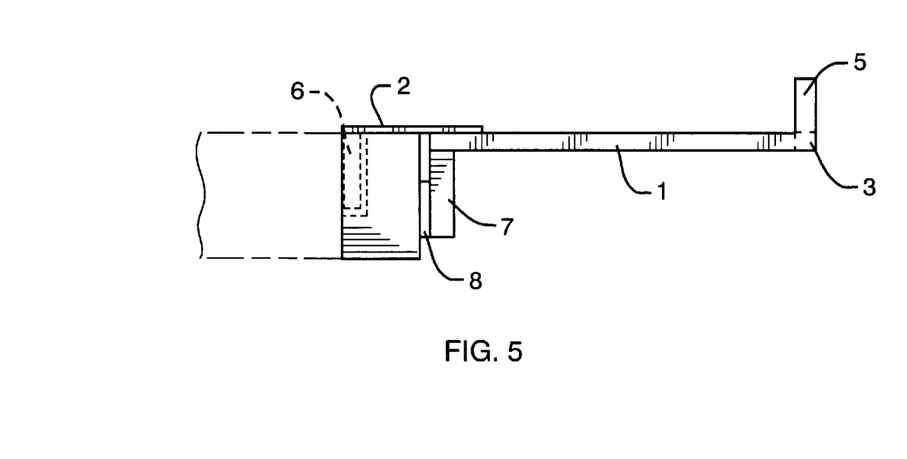
FIG. 5 is a side, elevational view of another embodiment of the present invention.
Figure 6:
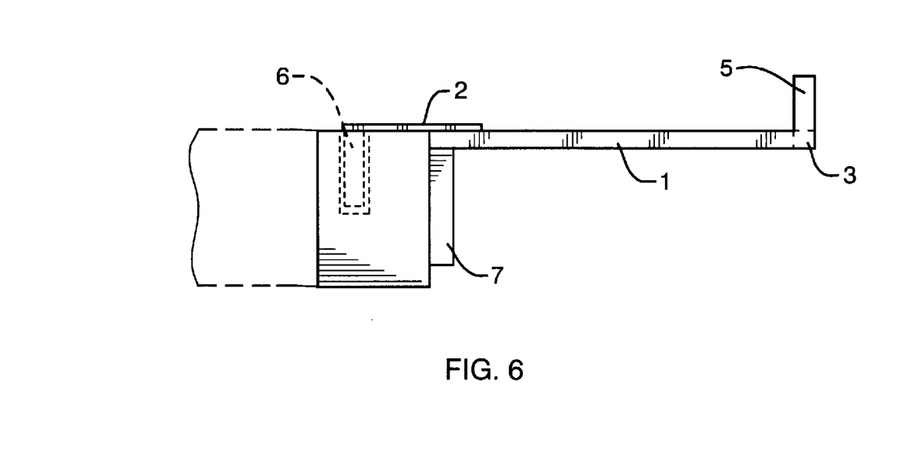
FIG. 6 is a side, elevational view of a further embodiment of the invention.
Figure 7:
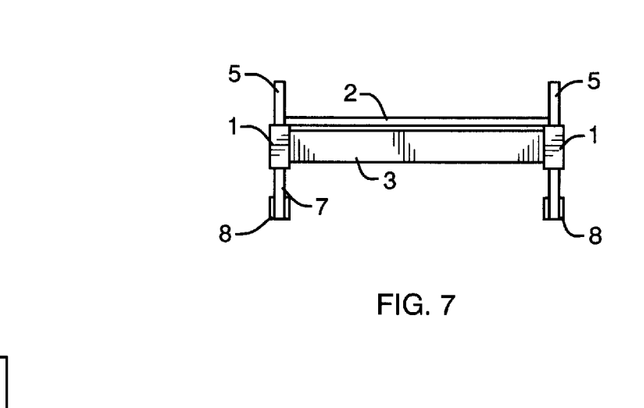
FIG. 7 is a back, elevational view of a further embodiment of the present invention, shown in FIG. 5.

In another embodiment, as shown in FIGS. 3 and 4, the elongated members are comprised of at least partially hollow members 1a and telescoping members 1b. Partially hollow members 1a are adapted to receive said telescoping members 1b.

Telescoping members 1b have end stops 9 to prevent disengagement from at least partially hollow member 1a. End stops 9 have dimensions that are greater than the cross-sectional dimensions of telescoping members 1b and smaller than the inner cross-sectional dimensions of the at least partially hollow members 1a.

Flanges if, situated at distal ends of the partially hollow members 1a engage end stops 9 to prevent disengagement.

Figure 8:
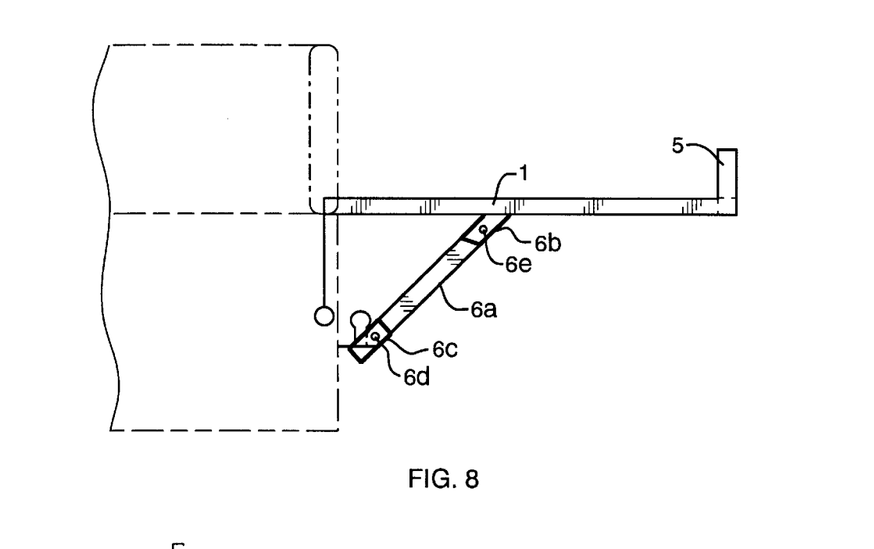
FIG. 8 is a side, elevational view of a still further embodiment of the present invention.
Figure 9A:
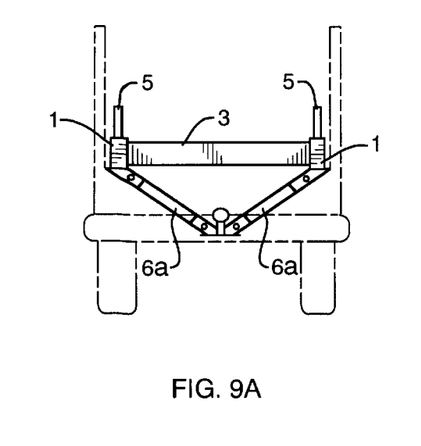
FIG. 9a is a top view of the embodiment of the invention shown in FIG. 9.
Figure 9B:
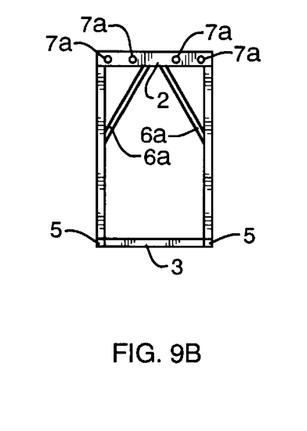
FIG. 9 is a back, elevational view of a still further embodiment of the present invention.

A further embodiment is shown in FIGS. 8, 9 and 9a. In place of insertion pins 6 and support pins 7, braces 6a can be used to support the extension apparatus. To secure the extension apparatus to the truck body, front cross member 2 is attached to the truck body bed directly with mechanical fasteners 7a inserted into apertures (not shown) provided in front cross member 2 and in the truck body bed. Hollow bottom brace brackets 6c are provided which are configured to matingly engage braces 6a. Hollow bottom brace brackets 6c are affixed to a lower portion of the truck body to anchor braces 6a. Hollow top brace brackets 6b are provided which are also configured to matingly engage braces 6a. Hollow top brace brackets 6b are affixed to bottom portions of elongated members 1. Braces 6a are releasably secured to bottom brace brackets 6c and top brace brackets 6b with pins 6d and 6e, respectively, which are inserted into apertures (not shown) which are provided in braces 6a, top brace brackets 6b and bottom brace brackets 6c. The apertures provided in braces 6a, top brace brackets 6b and bottom brace brackets 6c are aligned when braces 6a are inserted into the brace brackets.

Figure 10A:
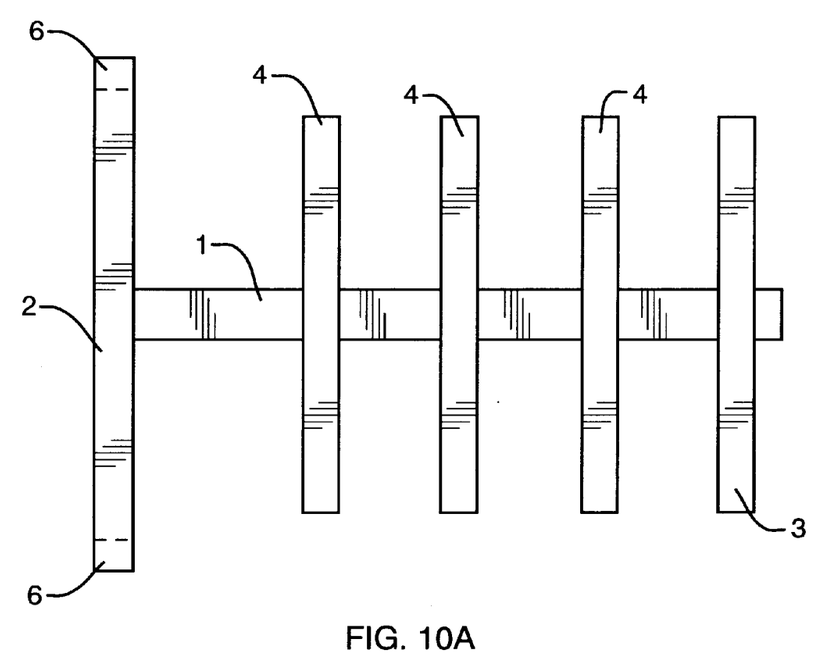
FIG. 10a is a side elevational view of another embodiment of the invention.
Figure 10B:
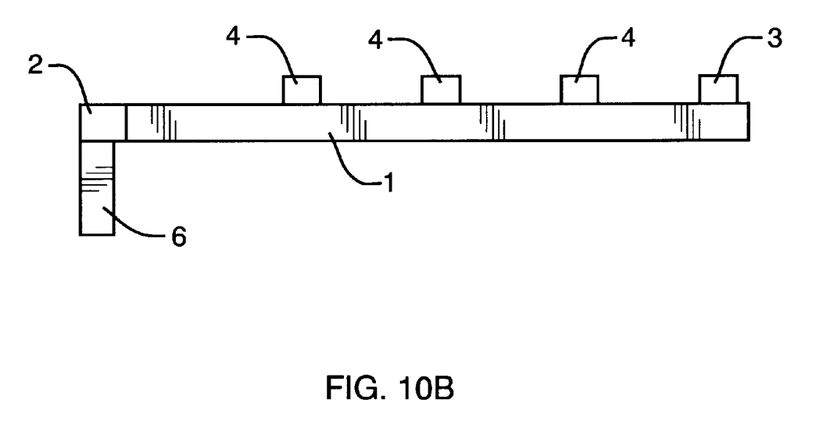
FIG. 10b is a side elevational view of another embodiment of the invention.
Figure 11A:
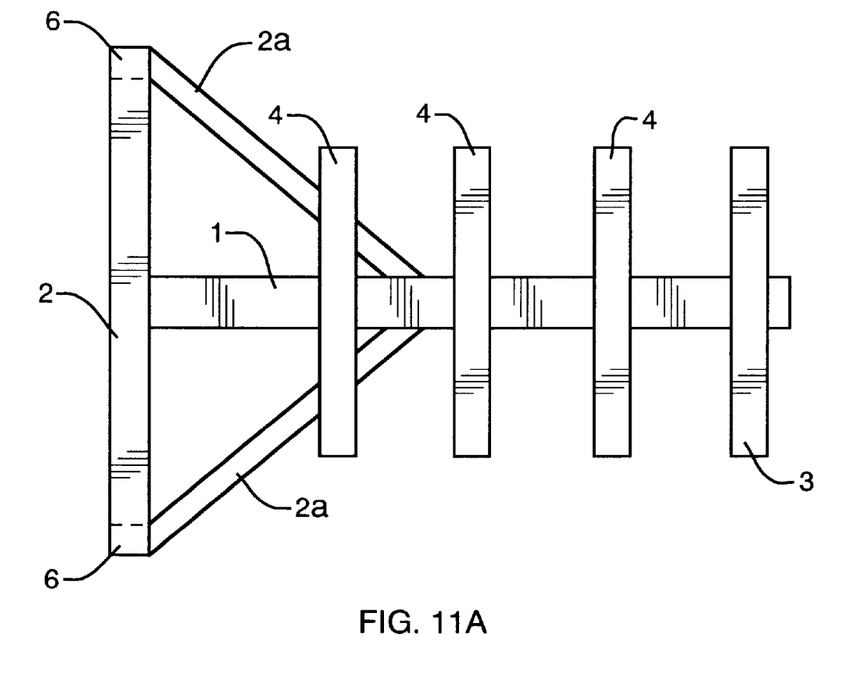
FIG. 11a is a side elevational view of yet another embodiment of the invention.
Figure 11B:
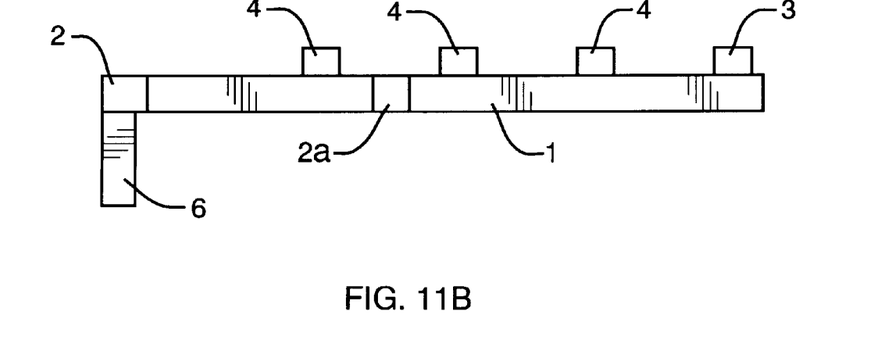
FIG. 11 is a top plan view of yet another embodiment of the invention.

Turning to FIGS. 10 and 10a, another embodiment is shown which employs only one elongated member 1. In this embodiment, elongated member 1 extends perpendicularly from front cross member 2. The combination of insertion pins 6 and cross member 2 releasably lock the extension apparatus in place when in use. Back cross member 3 and cross members 4 are oriented perpendicular to, and preferably centered relative to, elongated member 1. Preferably, each cross member 3 and cross member 4 has a circular cross section to facilitate the unloading of materials transported on the extension apparatus as shown in FIG. 10B. As shown in FIGS. 11 and 11a, the embodiment shown in FIGS. 10 and 10a can be modified by adding diagonal members 2a to provide additional lateral support to elongated member 1.

Figure 12:
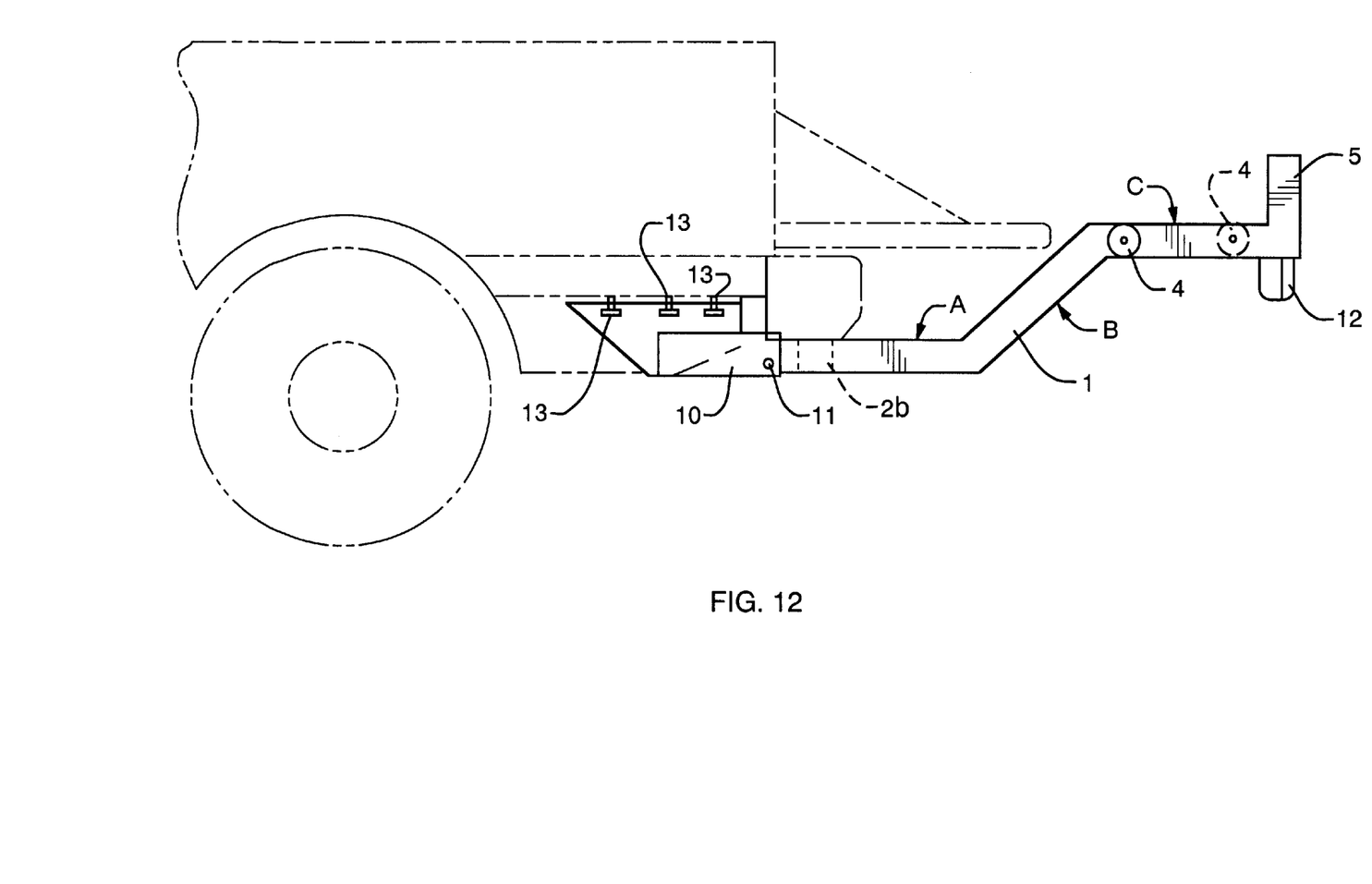
FIG. 12 is a side elevational view of a still further embodiment of the invention.
Figure 13:
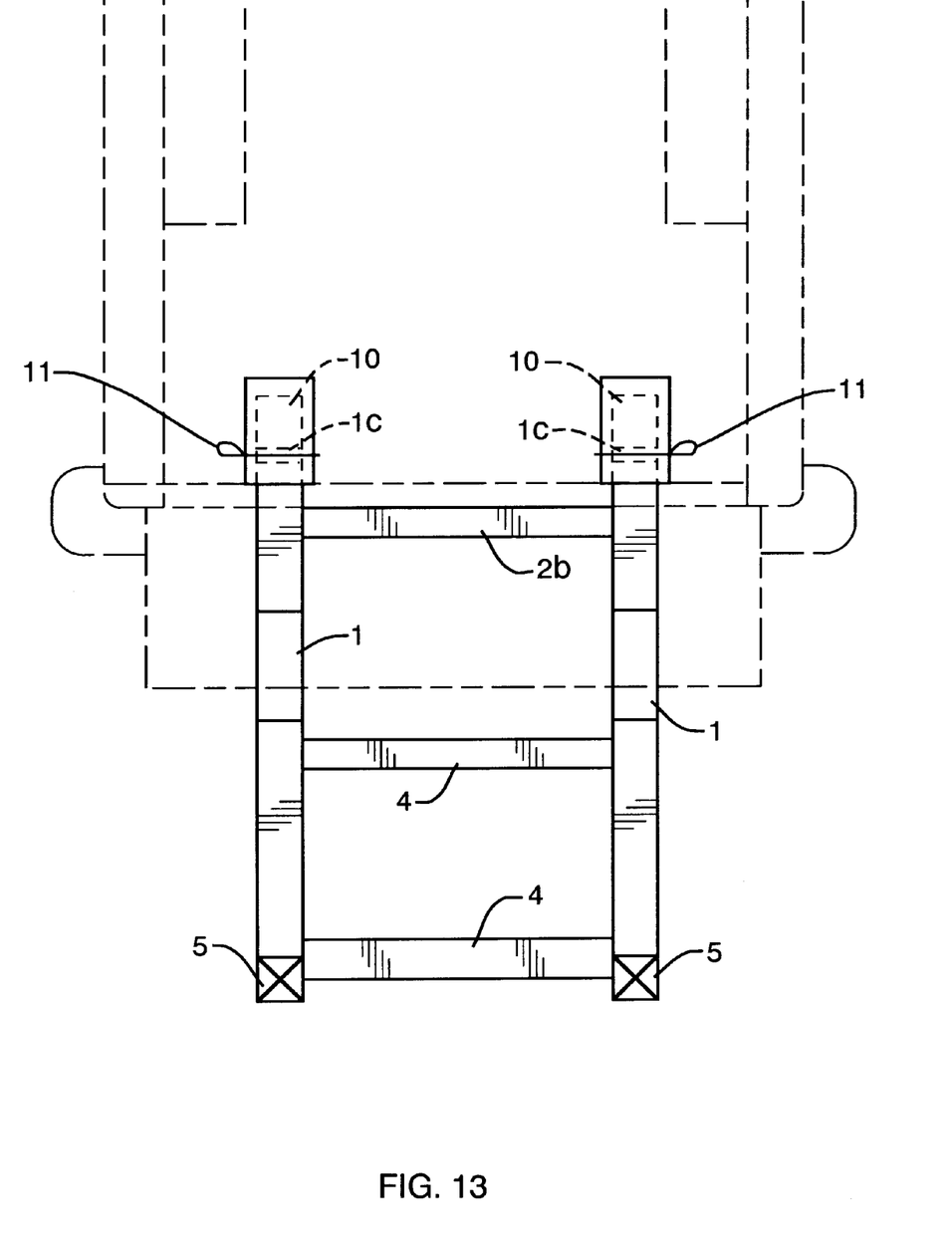
FIG. 13 is a top plan view of the embodiment of the invention shown in FIG. 12.
Figure 14:
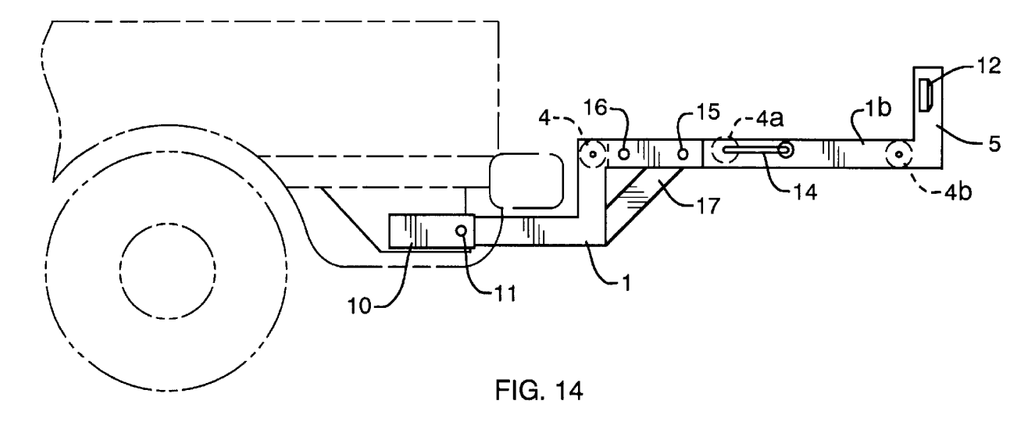
FIG. 14 is a side elevational view of a yet further embodiment of the invention.
Figure 15A:
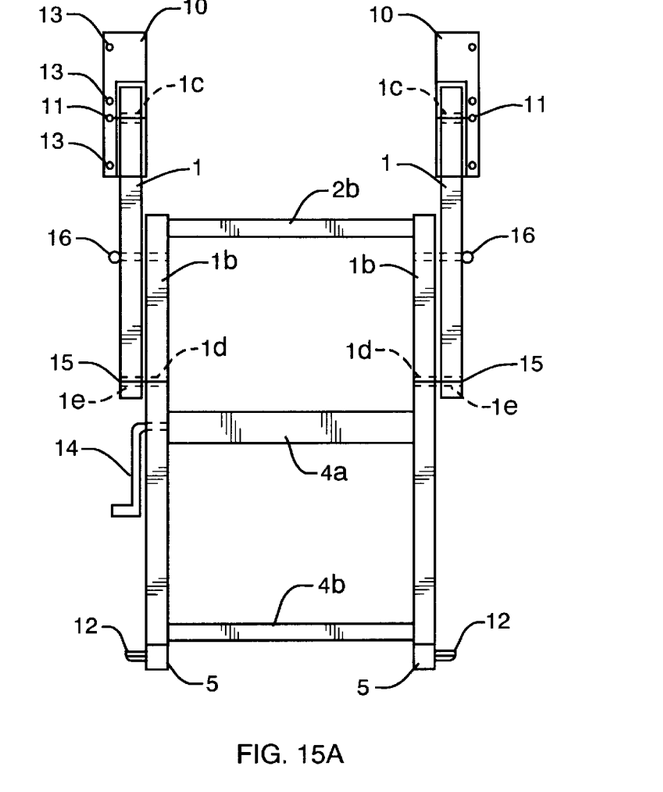
FIG. 15a is a side elevational view of an extension body elongated member according to one embodiment of the invention.
Figure 15B:
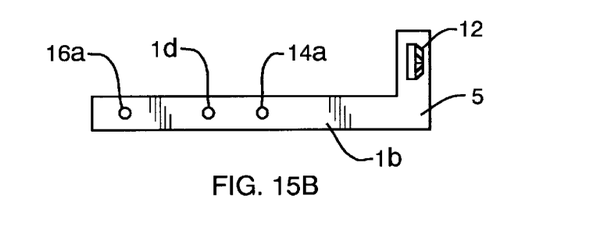
FIG. 15 is a top plan view of the embodiment of the invention shown in FIG. 14.
Figure 16:
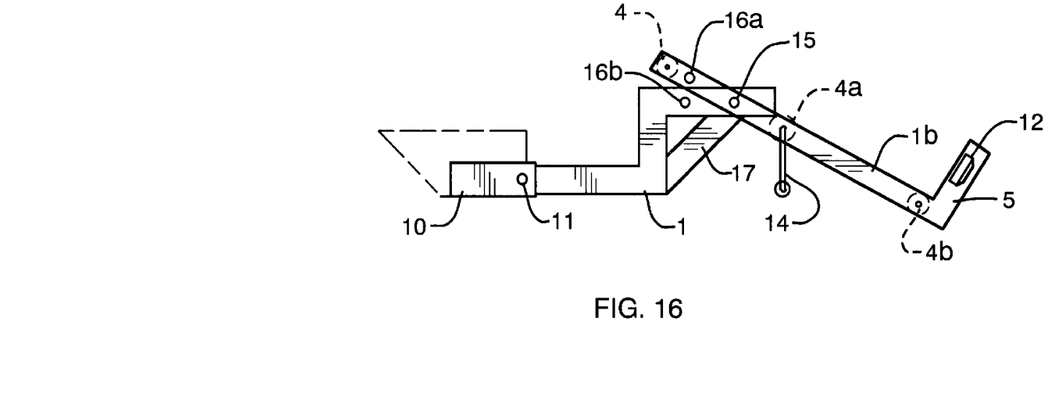
FIG. 16 is a side elevational view of an embodiment of the invention.
Figure 17:
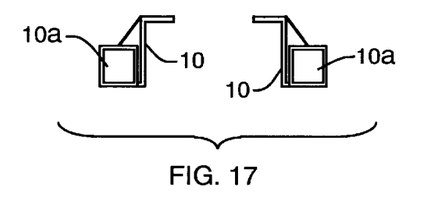
FIG. 17 is an end view of mounting brackets according to one embodiment of the invention.
Figure 18:
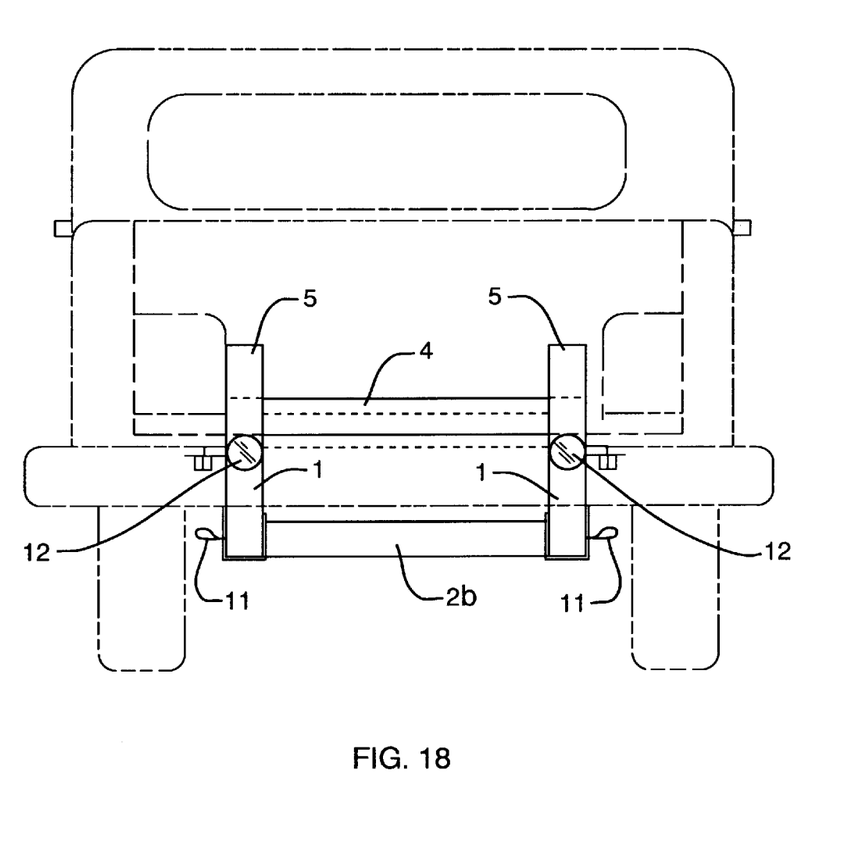
FIG. 18 is an end elevational view of the embodiment of the invention shown in FIG. 14.

Another embodiment, shown in FIGS. 12 and 13, is particularly adapted to be secured to a pick-up truck with a tail gate. As shown in FIG. 12, elongated member 1a is configured to have three subsections, a proximal, middle and distal sections, A, B and C, respectively, that are joined to form two angular bends. Optionally, brace 17 can be provided to add additional support to distal section C as shown in FIGS. 14. and 16. This configuration allows for the accommodation of a pick-up truck body tail gate. The proximal sections A of elongated members 1 are sized to matingly engage extension brackets 10. As shown in FIG. 17, extension brackets 10 have large first apertures 10a sized to receive the proximal sections A of elongated members 1. Extension brackets 10 can also have second apertures (not shown) for securing the extension brackets 10 to the truck chassis frame with mechanical fasteners 13. Alternatively, extension brackets 10 can be welded to the truck chassis frame.

To secure elongated members 1 to extension brackets 10, third apertures 1c are provided in extension members 1 and apertures 10b are provided in extension brackets 10 as shown in FIG. 17a. Apertures 1c and 10b are in alignment when elongated members 1 are engaged in extension brackets 10. Pins 11 are provided and inserted into the aligned apertures to releasably secure elongated members 1 to extension brackets 10.

Still referring to FIG. 12, elongated members 1 are attached via front cross member 2a and cross members 4. Cross members 4 are attached to distal sections C of elongated members 1a and are substantially coplanar with the truck body bed and lowered tail gait assembly. Extending upwardly from distal sections C of elongated members 1 are optional guide pins 5 which provide lateral support for any materials placed on the extension apparatus. An additional option are brake lights 12 which can be suspended from elongated members 1.

Referring to FIGS. 14,15,15a,16 and 18, a modification of the embodiment shown in FIGS. 12 and 13 is depicted. Elongated members 1 are configured as shown to provide substantially coplanar alignment with the truck body bed to which an extension body is attached. Situated parallel with, and extending distally beyond, distal section C of elongated members 1 are extension body elongated members 1b. Extension body elongated members 1b are rotatably secured to elongated members 1 via first extension body pins 15 which are fixedly inserted into apertures 1e provided in elongated members 1 and apertures 1d provided in extension body elongated members 1a. The apertures, when aligned and secured with pins 15, provide a pivot point for rotation of the extension body about pins 15.

Extension body elongated members 1b are releasably secured into a parallel orientation to elongated members 1 via second extension body pins 16 that are releasably secured to extension body elongated members 1b via insertion into apertures 16b provided in elongated members 1 and apertures 16a provided in extension body elongated members 1b. When extension body elongated members 1b are rotated about pins 15 so that elongated members 1 and extension body elongated members 1b are in parallel alignment, apertures 16b and 16a are in alignment.

Extension body elongated members 1b are attached via extension body front cross member 2a, roller cross member 4a and extension body cross member 4b. Roller cross member 4a is rotatably secured to extension body elongated members 1b via apertures in the extension body elongated members 1b and a crank handle 14 (described below) in an axial end of roller cross member 4a and a pin in the other axial end of roller cross member 4a. Preferably, roller cross member 4a has a cross-sectional diameter greater than the cross-sectional diameter (or dimensions if non-circular cross section) of extension body cross member 4b to allow for the creation of friction between roller cross member 4a and any material placed on the extension apparatus. To enhance the generation of friction, roller cross member 4a can be coated or covered with a material such as rubber or can be modified to have a ribbed surface.

Extending from, and affixed to, an axial end of roller cross member 4a is a crank handle 14 for rotating roller cross member 4a about a longitudinal axis. Crank handle 14 has a portion adapted to rotate within an aperture 14a provided in at least one extension body elongated member 1b. To operate the extension apparatus embodiment shown in FIGS. 14–16, pins 16 are removed from the extension apparatus. Next, crank handle 14 is rotated to cause the distal movement, relative to the extension apparatus, of the materials placed on the extension apparatus. When slightly more than half the weight of the materials is situated distally from the vertical plane occupied by pins 15, the weight of the material will cause the rotation of the extension body such that a distal end of the extension body will be rotated downwardly which will facilitate removal of the materials from the truck body and extension apparatus.

The invention can be manufactured using common materials such as steel. Other materials such as fiberglass, polycarbonate or any other engineering grade plastic material that can withstand the stress the truck body extension is subjected to when used to support a load such as lumber can also be used. If steel or any ferrous or non-ferrous metal is used, joints between the various segments of the extension apparatus can be welded or joined with mechanical fasteners situated in apertures provided in the segments in appropriate locations.

It is to be understood that the present invention is by no means limited to the particular constructions herein disclosed and/or shown in the drawings, but also comprises any modifications or equivalents within the scope of the claims. It will be appreciated that the instant specification and claims are set forth by way of illustration and not made without departing from the spirit and scope of the present invention. Having thus described my invention, what I claim as new and desire to secure by United States Letters Patent is:

What is claimed is:

1. A truck body extension comprising:
   at least one elongated member having a proximal end and a distal end;
   a front cross member attached to the proximal end of the at least one elongated member;
   a back cross member attached to the distal end of the at least one elongated member;
   an insertion pin attached to the proximal end of the at least one elongated member and adapted to matingly engage an aperture in a truck body, the insertion pin extending from a bottom surface of said front cross member; and,
   a support pin attached to the at least one elongated member at a point distal to the proximal end, the support pin extending from a bottom surface of the at least one elongated member such that the elongated member is in contact with the truck body.

2. The truck body extension of claim 1 further comprising a plate attached to a distal end of said support pin.

3. The truck body extension of claim 1 further comprising a guide pin extending from a top surface of said at least one elongated member.

4. The truck body extension of claim 1 further comprising an intermediate cross member.

5. The truck body extension of claim 1 further comprising at least one telescoping member having an end stop wherein said at least one elongated member is partially hollow, adapted to receive said at least one telescoping member and has a flange situated at a distal end to engage said end stop to prevent disengagement of said at least one telescoping member and said partially hollow at least one elongated member.

6. The truck body extension of claim 5 wherein said end stop has dimensions that are greater than the cross-sectional dimensions of said at least one telescoping member and less than inner cross-sectional dimensions of said partially hollow at least one elongated member.

7. The truck body extension of claim 1 further comprising diagonal members attached to said front cross member and said at least one elongated member.

* * * * *